United States Patent [19]

LeBegue

[11] 4,245,525
[45] Jan. 20, 1981

[54] LIMITED SLIP DIFFERENTIAL

[75] Inventor: Maurice K. LeBegue, Argillite, Ky.

[73] Assignee: National Mine Service Company, Pittsburgh, Pa.

[21] Appl. No.: 874,259

[22] Filed: Feb. 1, 1978

[51] Int. Cl.³ .............................................. F16H 1/45
[52] U.S. Cl. ................................................... 74/711
[58] Field of Search ........................................ 74/711

[56]  References Cited
U.S. PATENT DOCUMENTS

| 3,495,298 | 2/1970 | Engle et al. | 74/711 |
| 3,580,108 | 12/1969 | Mieras | 74/711 |
| 3,624,717 | 2/1970 | Brubaker | 74/711 |
| 3,815,442 | 6/1974 | McAninch et al. | 74/711 |
| 3,893,351 | 7/1975 | Baremor | 74/711 |
| 3,929,036 | 12/1975 | Shealy | 74/711 |

Primary Examiner—Allan D. Herrmann
Attorney, Agent, or Firm—Stanley J. Price, Jr.; John M. Adams

[57] ABSTRACT

A pair of differential side gears are splined to separate driven shafts that rotate the driven wheels of a vehicle. Rotation of a driven shaft is transmitted through a differential case and spider gears to the side gears. The side gears are rotatably mounted on a thrust assembly. Belleville spring assemblies exert a biasing force upon interleaved clutch plates alternately splined to the case and the side gears. Upon the occurrence of an unequal torque distribution between the driven shafts the gear separating forces exerted by the spider gears upon the side gears become imbalanced. The side gear associated with the driven shaft of the wheel having reduced traction is displaced axially toward the spider gears. This axial movement is transmitted through the thrust assembly to the side gear associated with the driven shaft of the wheel having the greater traction to axially move the side gear and compress the clutch plates to frictionally engage the case and the side gear. Rotation is transmitted from the case through the clutch plates to the side gear to increase the torque of the driven shaft of the wheel having the greater traction and thereby rotate the wheel having the greater traction.

8 Claims, 1 Drawing Figure

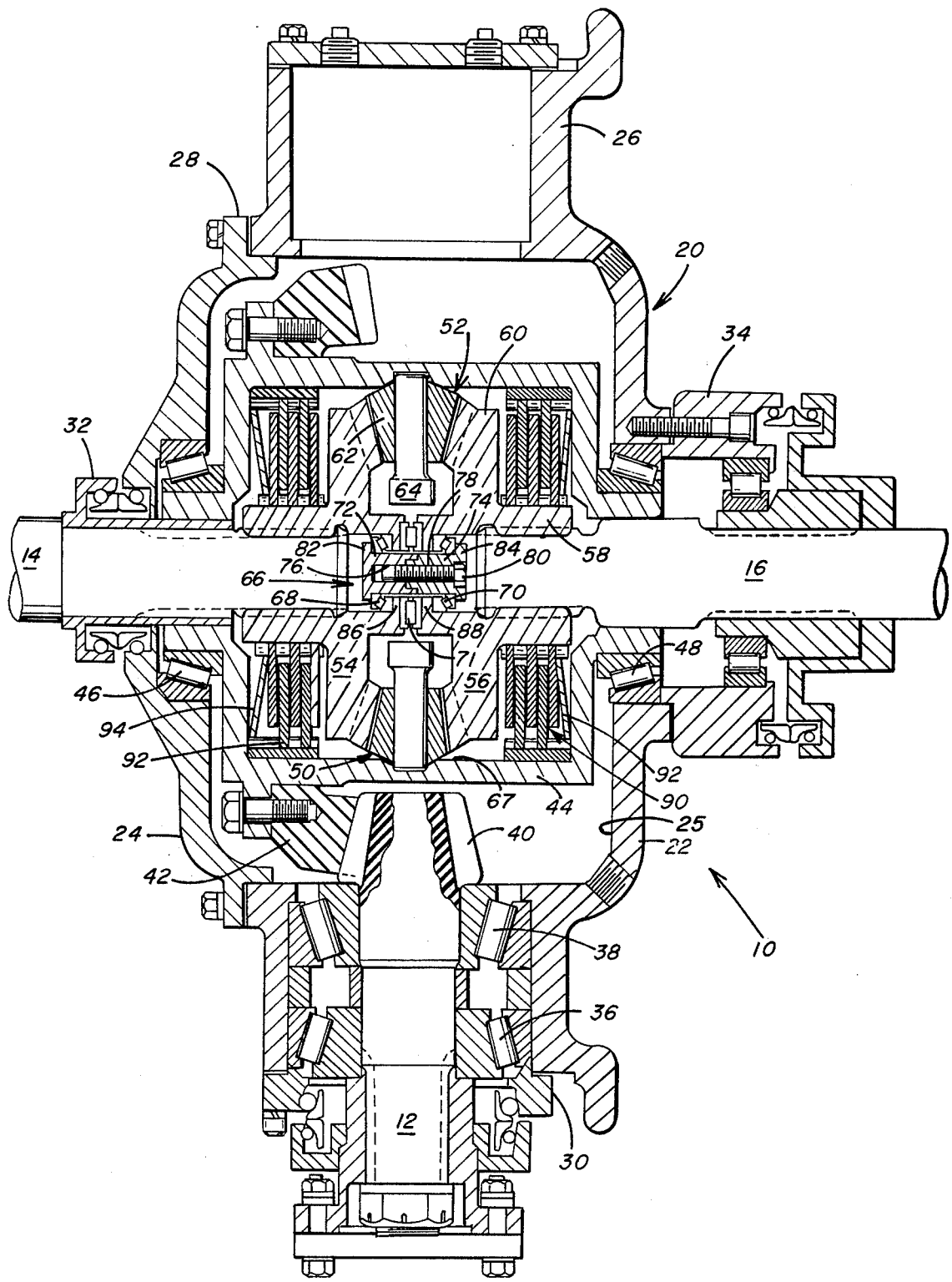

LIMITED SLIP DIFFERENTIAL

BACKGROUND OF THE INVENTION

1. Field of the Invention

This invention relates to a limited slip differential for connecting a driving shaft with a pair of driven shafts and more particularly to a limited slip differential that upon the occurrence of unequal torque distribution utilizes the axial displacement of the side gear of the driven shaft having the lower reaction torque to urge the side gear of the driven shaft having the greater reaction torque into increased frictional engagement with the differential case to transmit rotation from the case to the side gear and thereby increase the torque of the driven shaft to rotate the wheel having greater traction.

2. Description of the Prior Art

The conventional differential for a motor driven vehicle, such as an automobile and other similarly powered vehicles supplies equal torque to the shafts that rotate the driven wheels. The differential permits one driven wheel to rotate faster than the other driven wheel when turning or when traction is reduced at one of the driven wheels. With a conventional differential the driving shaft from the transmission is connected by a bevel pinion gear to a ring gear that rotates the differential case. Differential side gears are rotatably supported within the case and are nonrotatably splined to each driven shaft. The side gears are connected through spider gears or differential pinion gears to the rotatable differential case. The shafts of the spider gears are secured to the differential case and are rotated with the differential case on the respective shafts.

When the torque is evenly distributed to the two driven shafts the amount of traction that can be obtained is dependent upon the lowest coefficient of friction for the traction wheels. Thus, if one wheel is operating on a slippery surface, such as mud, snow, ice, loose sand and the like, the amount of tractive effort the vehicle can develop is reduced regardless of the coefficient of friction that may exist between the road surface and the other traction wheel. One wheel will lose torque in proportion to the amount of traction lost in the other wheel, and consequently, the wheel which loses its traction spins while the other wheel on the traction surface receives no drive and remains motionless so that the vehicle is not propelled.

One approach to overcome this difficulty is to introduce a torque bias into the system by clutching one of the side gears to the differential case to avoid the freewheeling effect that accompanys an unequal power distribution to the driven shafts. U.S. Pat. No. 3,548,683 discloses a positive driving connection between the differential case and the driven shafts through the side gears. If one driven shaft should rotate relative to the other, however, the ring gear will wobble about a central pivot point lying on the axis of the driven shafts. The teeth of the ring gear are arranged to slide into meshing engagement with the teeth of the side gears to establish a positive driving connection between the ring gear and the side gears so that a friction force, as well as, an inertia force creates a torque bias that resists unequal power distribution to the driven shafts.

U.S. Pat. Nos. 3,577,888 and 3,474,689 also introduce a torque bias into the system by providing frictional engagement of the side gear associated with the freewheeling gear with the rotating differential case. The frictional engagement of the side gear with the rotating case reduces the speed of the side gear which is rotating at a speed greater than the differential case. In this manner traction is restored to the spinning wheel by balancing the driving force between both driven shafts.

U.S. Pat. No. 3,513,723 utilizes floating spider gears that connect the rotating case to the side gears and a lock portion which is disposed between and engageable by the adjacent end faces of the spider gears. Upon the occurrence of a differential condition, the spider gears are wedged between the lock portion and the differential case to frictionally retard the rotation of the spider gears relative to the differential case. This has the affect of locking the case to the side gears so that the side gears rotate with the case at the same rotational speed.

U.S. Pat. No. 3,964,346 discloses torque-responsive wedge means which are operable by the differential pinion gears to apply friction torque bias to the driven shafts via the side gears. Bias is also applied to the driven shafts by the separating forces between the gear teeth, as well as, the bias created by the friction between the differential pinion gears and their respective conical seats in the case. With this arrangement, the driven shafts rotate at the same speed, and upon the occurrence of a slip condition by one of the wheels associated with the driven shafts, the shafts rotate at relative speeds determined by the bias ratio of the apparatus. A minimum torque bias is also applied to the differential as disclosed in U.S. Pat. No. 3,343,429 so that when one driven shaft loses tractive effort, a sun gear is shifted either left or right to frictionally engage the case or engage the case through a planet gear carrier. This locks the driven shafts to the case so that both shafts rotate at the same speed, and power is delivered to the wheel having traction.

It is known to apply a breaking effect to a freewheeling driven shaft, as disclosed in U.S. Pat. No. 3,523,467, by urging a friction clutch into engagement with the case. In this manner the freewheeling driven shaft is locked, as well as, the other differential gear elements so that the elements rotate together in unison to establish a minimum torque bias. Differentials that are also operable to resist the freewheeling of the differential gear elements when one of the driven wheels loses traction are disclosed in U.S. Pat. Nos. 3,335,623; 3,779,101; 3,828,877 and 3,874,250.

While it has been suggested by the prior art systems to introduce a torque bias into the differential system by clutching the side gear associated with a freewheeling driven shaft to the differential case and thereby equally distribute torque to each driven shaft, there is need to provide apparatus in the differential that upon the occurrence of a differential condition and the resultant axial shifting of one of the side gears due to unequal torque distribution to increase the torque applied to the driven shaft of the wheel having the greater traction.

SUMMARY OF THE INVENTION

In accordance with the present invention there is provided a limited slip differential for connecting a driving shaft with a pair of driven shafts that includes a rotatable case drivingly connected to the driven shaft. The case has a sidewall forming a chamber with aligned bores extending through the sidewall for receiving the adjacent end portions of the driven shafts. First and second differential side gears are nonrotatably connected to the driven shafts respectively within the case chamber. A plurality of spider gears are secured to the case for rotation relative thereto and are positioned in meshing relation with the first and second differential side gears. A friction device is positioned between the case sidewall and the first and second differential side gears respectively. The friction device is operable in response to an unequal torque distribution between the driven shafts to frictionally engage the case with the differential side gear associated with the driven shaft having the greater reaction. A thrust assembly is positioned between the first and second differential side gears, and is operable to transmit axial movement of one of the differential side gears to the other of the differential side gears resulting from an imbalance in the gear separating forces exerted by the spider gears on the side gears. Upon the occurrence of an unequal torque distribution of the driven shafts the axial movement of one of the differential side gears toward the spider gears is transmitted by the thrust assembly to the other differential side gear. Axial movement of the other differential side gear compresses the friction device to engage the other differential side gear with the case for rotation together. Rotation is transmitted from the case to the other differential side gear to thereby increase the torque of the driven shaft having the greater reaction torque.

The first and second differential side gears are rotatably positioned on the thrust assembly. The thrust assembly includes a pair of shaft members that are engaged in interlocking relationship and are rigidly connected by a threaded member that is threadedly received within aligned bores of each shaft member. The adjacent end portions of the shaft members are secured together and each includes a shoulder extending outwardly from the opposite end of the shaft member. Each shoulder is spaced from a radially extending flange of one of the differential side gears. A roller bearing is positioned between each shoulder and flange. A thrust bearing centrally surrounds the connected end portions of the shaft members and is positioned between and in abutting relation with the flanges of the side gears. With this arrangement the side gears are rotatably positioned relative to each other on the shaft members and are connected to transmit axial movement from one side gear to the other side gear.

When the driving force of the driving shaft is equally distributed to the pair of driven shafts, the separating forces exerted upon the differential side gears by the spider gears are opposed by the forces exerted by the shaft members through the bearings upon the flanges of the differential side gears. In this manner the differential side gears are centrally positioned within the case chamber under normal operating conditions when the driven shafts rotate at equal torque.

In the event one of the wheels associated with a driven shaft encounters a low friction surface, such as mud, ice, snow and the like, or leaves the traction surface, the reaction torque decreases and the wheel rotates faster than the case and the spider gears rotate relative to the case. The unequal torque distribution interrupts drive to the other differential side gear and the associated driven shaft with the wheel thereof which has greater traction with the travelled surface. With the present invention the differential side gear associated with the driven shaft having the lower reaction torque is urged axially toward the spider gears. This axial movement is transmitted through the thrust assembly to the opposite differential side gear, which is subsequently displaced axially toward the case sidewall.

Axial displacement of the differential side gear associated with the driven shaft of the wheel having the greater traction compresses the clutch plates of the friction device against each other and against the resilient member. The clutch plates are alternately splined to the hub of the side gear and the case so that when the clutch plates are pressed together the case and the side gear are engaged for rotation together. Consequently, rotation is transmitted from the case through the friction device to the differential side gear. The differential side gear is then rotated at the speed of the case. Thus, increased torque is supplied to the driven shaft of the wheel having the greater traction because of the differential condition, to thereby rotate the wheel and propel the vehicle.

Accordingly, the principal object of the present invention is to provide a limited slip differential having a pair of differential side gears that are rotatably supported on a thrust assembly and biased in a central position under normal operating conditions and axially movable upon the occurrence of a differential condition to urge the differential side gear associated with the driven shaft of the wheel having the greater traction into frictional engagement with the rotating case to transmit greater torque to the driven shaft and rotate the wheel having the greater traction.

Another object of the present invention is to provide a limited slip differential having a pair of differential side gears connected by a thrust assembly in a manner to transmit axial movement between the respective side gears so that upon a differentiation of the torque applied to the driven shafts, the differential side gear associated with the driven shaft of the wheel having reduced traction is moved axially to move the other differential side gear and frictionally engage the side gear with the rotating case and thereby transmit additional torque to the driven shaft of the wheel having greater traction.

These and other objects of the present invention will be more completely disclosed and described in the following specification, the accompanying drawing and the appended claims.

BRIEF DESCRIPTION OF THE DRAWING

The FIGURE is a sectional view in side elevation of a limited slip differential, illustrating a pair of spring biased differential side gears rotatably mounted on a thrust assembly for transmitting axial movement of one differential side gear to the other differential side gear upon the occurrence of a differential condition.

DESCRIPTION OF THE PREFERRED EMBODIMENT

Referring to the FIGURE, there is illustrated a limited slip differential generally designated by the numeral 10 for connecting a driving shaft 12 from a propelling means (not shown) with a pair of driven shafts 14 and 16. The driven shaft 14 provides differential drive for one wheel assembly (not shown), and the driven shaft 16 provides differential drive for the other wheel assembly (not shown). A prime mover supplies power through the differential 10 to the wheel assemblies for propelling a vehicle and preferably in accordance with the present invention a mine haulage vehicle, such as a shuttle car, illustrated in U.S. Pat. No. 2,754,015, which is operated in an underground mine for transporting mined material from the mine.

The limited slip differential 10 includes a cylindrical carrier 20 having circular sidewalls 22 and 24 forming a chamber 25. The sidewall 22 has a circular inwardly extending circumferential flange portion 26 which abuts an inner circumferential edge 28 of the other sidewall 24 to thus form the cylindrical carrier 20. The differential 10 is a self-contained sealed unit adapted to retain a separate supply of lubricant for lubricating various gears, shafts and bearings of the differential. The circular flange portion 26 has a driving shaft receiving portion 30 extending therefrom. Driven shaft receiving portions 32 and 34 extend outwardly from the sidewalls 22 and 24 along the longitudinal axis of the carrier 20. The portions 32 and 34 have aligned bores for receiving the driven shafts 14 and 16 respectively to rotatably support the driven shafts.

The driving shaft 12 from the transmission is rotatably supported in the receiving portion 30 by bearings 36 and 38. A bevel gear 40 is secured to the end of the driving shaft 12 and meshes with a large bevel ring gear 42. The ring gear 42 is bolted to a case 44 which is rotatably supported by bearings 46 and 48 to rotate within the carrier along an axis transverse to the axis of the driving shaft 12.

A plurality of spider gears (only two of which are shown in the FIGURE) 50 and 52 are secured to the case 44 for rotation relative thereto and are positioned in meshing relation with a pair of differential side gears 54 and 56. The side gears 54 and 56 are splined to the transversely extending driven shafts 14 and 16 respectively. With this arrangement differential drive is transmitted to the wheel assemblies mounted on the driven shafts 14 and 16.

Each differential side gear 54 and 56 includes a hub portion 58 that is splined to the end portion of the respective driven shaft and a radially extending gear portion 60 having teeth meshing with a conical gear segment 62 of each spider gear 50 and 52. Each conical gear segment 62 is journaled on a stub shaft 64 that has an end portion rotatably supported within the sidewall of the case 44. With this arrangement, rotation of the case 44 upon rotation of the driving shaft 12 carries the spider gears 50 and 52 therewith under normal operating conditions when the torque is distributed equally to the driven shafts 14 and 16. In this instance the differential side gears 54 and 56 are drivingly connected to the case 44 by the spider gears 50 and 52 so that rotation of the case is transmitted to the differential side gears and the respective driven shafts 14 and 16 respectively.

The adjacent end portions of the driven shafts 14 and 16 are maintained in spaced relation and a thrust assembly generally designated by numeral 66 is positioned within a chamber 67 formed by the case 44 between the adjacent end portions of the driven shafts 14 and 16. The thrust assembly 66 includes a pair of roller bearings 68 and 70 that are operable to axially position the differential side gears 54 and 56 in the case 44 and a thrust bearing 71 which connects the side gears to permit relative rotation between the side gears. This permits the side gears 54 and 56 to rotate relative to each other around the thrust assembly 66. The thrust assembly 66 also includes a pair of shaft members 72 and 74 having interlocking end portions and axially aligned bores 76 and 78. The bores 76 and 78 are threaded to receive the threaded member 80, which is advanced through the end of shaft 74 into connection with shaft 72 to securely connect the shafts 72 and 74.

The bearings 68 and 70 are positioned on the outer cylindrical surface of shafts 72 and 74 between and in abutting relation with the shoulders 82 and 84 of the respective shafts and the shoulders 86 and 88 of the flanged end portions of side gears 54 and 56 respectively. The thrust bearing 71 is connected to the flanged end portions of side gears 54 and 56 and maintains the gears in spaced relation and rotatable relative to each other. With this arrangement, axial movement of one side gear is transmitted by the thrust bearing 71 to the other side gear.

Under normal operating conditions of the differential 10 when equal torque is supplied to the driven shafts 14 and 16, the side gears 54 and 56 are centrally positioned within the case chamber 67. The gear portions 60 of each side gear are spaced opposite the sidewalls of the case 44. Friction devices generally designated by the numeral 90 are positioned in surrounding relation with the hub portions 58 opposite the gear portions 60. Preferably, the friction devices 90 include an assembly of friction generating, annular, interleaved clutch plates 92 alternately splined to the case 44 and side gear hub portions 58.

The case 44 has an internal splined portion operable to receive clutch plates, each having an external splined portion which meshes with the case internal splined portion so that the clutch plates rotate with the case but are movable axially relative thereto. Similarly, the hub portion 58 of each side gear has an externally splined portion which meshes with the internal splined portion of each clutch plate so that these clutch plates are nonrotatably secured to the side gear hub portions but are axially movable relative thereto. A resilient device 94, such as a Belleville spring assembly, which may include one or more Belleville spring washers, exerts a biasing force upon the clutch plates 92 to apply a fixed torque upon the differential side gears 54 and 56.

Under normal operating conditions when equal torque is transmitted from the rotating case 44 through the spider gears 50 and 52 to the differential side gears 54 and 56 and the driven shafts 14 and 16, separating forces are exerted by the spider gears 50 and 52 upon the side gears 54 and 56. The separating forces are applied outwardly upon the gear portions 60 and tend to move the side gears away from the conical segment 62 of the spider gears. When torque is evenly distributed to each driven shaft, the separating forces are balanced and the thrust assembly 66 and the bearing assemblies 68, 70 and 71 centrally position the side gears within the chamber 67. In addition, the Belleville spring washers of the resilient devices 94 exert a preselected load on the clutch plates 92. Thus, when the wheels have equal traction, the gear separating forces are balanced and the clutch load is determined by the force exerted by the Belleville spring washers.

Upon the occurrence of a differential condition where the torque is unevenly distributed between the driven shafts 14 and 16, one driven shaft experiences an increase in reaction torque; while the other experiences a reduction in reaction torque. The relative speed of rotation between the driven shafts is determined by the traction between the wheels and the travelled surface. When a wheel encounters a low friction surface condition, such as may be caused by mud, ice, loose sand and the like, or upon leaving the surface of travel the wheel loses traction and spins freely because the reaction torque of its driven shaft decreases. Consequently, the reaction torque of driven shaft 14, for example, decreases and shaft 14 rotates at twice the speed of the case 44. This produces rotation of the spider gears 50 and 52 relative to the differential side gears 54 and 56. Consequently, the reaction torque of driven shaft 16 increases because the wheel associated with driven shaft 16 does not rotate and remains motionless on the travelled surface.

In accordance with the present invention, a decrease in the reaction torque of driven shaft 14, for example, produces a reduction in the separating forces between the spider gears 50 and 52 and the differential side gear 54. The driven shaft 16 experiences an increase in reaction torque which results in a corresponding increase in the separating forces exerted by the spider gears 50 and 52 upon the differential side gear 56. Thus, the gear separating forces upon side gears 54 and 56 are no longer equal. The gear separating forces on side gear 56 are greater than the gear separating forces on side gear 54. Consequently, the side gear 54 shifts axially toward the spider gears 50 and 52. The axial movement of side gear 54 is transmitted through the thrust bearing 71 to the side gear 56. The side gear 56 moves away from the spider gears 50 and 52 to move the clutch plates 92 laterally against the biasing force of the Belleville spring washers. The interleaved clutch plates are axially compressed against each other and the spring washers. When the plates are compressed together they frictionally engage the side gear 56 with the case 44. In this manner the variation in the gear separating forces exerted upon the side gears, which occurs when one wheel loses traction, is utilized to engage the side gear of the wheel having the greater traction with the rotating case.

The thrust exerted upon the differential side gear 56 is proportional to the amount of torque imbalance. Thus as the clutch plates 92 shift laterally and are compressed, the increase in the clutch load on the side gear 56 is proportional to the torque imbalance. The interleaved clutch plates 92 are urged into frictional engagement with each other to, in turn, engage the side gear 40 with the case. Thus, torque is transmitted from the case 44 to the side gear 56 to rotate the shaft of the wheel having the greater traction.

In the event of unequal torque distribution, the resultant variation in the separating forces between the side gears and the spider gears is utilized to increase the clutch load on the side gear associated with the driven shaft of the wheel having the greater traction. The side gear is clutched to the rotating case, and rotation of the case is transmitted through the clutch plates to the side gear to increase the torque of the driven shaft of the wheel having the greater traction. The wheel is then rotated, and the vehicle is propelled.

Similarly, when the wheel associated with the driven shaft 16 loses traction, the reaction torque of the driven shaft 14 of the wheel having the greater traction is increased. Consequently the gear separating forces are no longer balanced and the side gear 56 shifts laterally toward the spider gears. The axial movement of the side gear 56 is transmitted by the thrust bearing 71 to the side gear 54. The lateral movement of the side gear 54 compresses the clutch plates 92 into frictional engagement to engage the side gear 54 with the case 44. In this manner the clutch load on the side gear 54 is increased and greater torque is transmitted from the case 44 through the clutch plates 92 to the driven shaft 14 of the wheel having the greater traction. When equal traction is restored to each wheel, the gear separating forces are balanced and the Belleville spring assembly washers preload the friction plates to apply a preselected torque bias upon the side gears 54 and 56.

According to the provisions of the Patent Statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. A Limited slip differential for connecting a driving shaft with a pair of driven shafts comprising, a rotatable case drivingly connected to the driving shaft, said case having a sidewall forming a chamber with aligned portions extending through said sidewall for receiving the adjacent end portions of the driven shafts, first and second differential side gears nonrotatably connected to said driven shafts respectively within said case chamber, a plurality of spider gears secured to said case for rotation relative thereto and positioned in meshing relation with said first and second differential side gears, said spider gears being operable to apply equal gear separating forces upon said first and second differential side gears when the torque distribution between said driven shafts is equal, friction means positioned between said case sidewall and said respective differential side gear for frictionally engaging one of said differential side gears to said case in response to an unequal torque distribution between the driven shafts, rotatable thrust means positioned between said first and second differential side gears for transmitting a thrust force from one of said differential side gears to the other of said differential side gears in response to an imbalance of the gear separating forces applied by said spider gears to compress said friction means, and said rotatable thrust means being operable in response to an unequal torque distribution and the accompanying axial movement toward said spider gears of one of said differential side gears of the driven shaft having reduced reaction torque to transmit an axial force to the other of said first and second differential side gears and move said respective differential side gear axially and compress said friction means so that the torque of said case is transmitted through said friction means to the differential side gear of the driven shaft having increased reaction torque.

2. A limited slip differential for connecting a driving shaft with a pair of driven shafts as set forth in claim 1 in which said thrust means includes, first and second shaft members connected in end to end relation and axially positioned within said case chamber between said adjacent end portions of the driven shafts, said first and second shaft members each having an axial bore therethrough, and a connecting member extending through said shaft member bores to rigidly connect said shaft members.

3. A limited slip differential for connecting a driving shaft with a pair of driven shafts as set forth in claim 1 wherein,
- said first and second differential side gears each include a hub portion splined to the respective driven shaft and a gear portion extending radially from said hub portion and positioned in meshing relation with said spider gears,
- said hub portions being rotatably supported by said thrust means to permit relative rotation between said first and second differential side gears,
- said friction means including a plurality of interleaved friction generating plates alternately splined to said case and said hub portions,
- a Belleville spring positioned coaxially on said hub portion of each of said differential side gears, and
- said Belleville spring being positioned between and in abutting relation with said case sidewall and said friction generating plates to exert a biasing force upon said friction generating plates to maintain a preselected load upon said friction generating plates and thereby exert a preselected torque bias on said first and second differential side gears.

4. A limited slip differential for connecting a driving shaft with a pair of driven shafts as set forth in claim 1 which includes,
- said first and second differential side gears each having a hub portion splined to the respective driven shaft,
- said friction means including a plurality of interleaved annular clutch plates alternately splined to said case and said first and second differential side gears, and
- resilient means positioned between and in abutting relation with said annular clutch plates and said case sidewall to exert a biasing force upon said annular clutch plates and thereby maintain a preselected torque bias on said differential side gears.

5. A limited slip differential for connecting a driving shaft with a pair of driven shafts as set forth in claim 1 wherein,
- said thrust means includes a shaft assembly axially aligned with and spaced from said adjacent end portions of the driven shafts within said case chamber,
- first bearing means surrounding said shaft assembly for rotatably supporting said first and second side differential gears on said shaft assembly,
- second bearing means surrounding said shaft assembly and abutting said first and second differential side gears for transmitting axial movement of one of said differential side gears to the other of said differential side gears, and
- said shaft assembly being operable in response to an unequal torque distribution between the driven shafts and an imbalance in the gear separating forces to transmit axial movement of the differential side gear associated with the driven shaft of reduced reaction torque to the other differential side gear associated with the driven shaft having increased reaction torque and thereby move said other differential side gear into engagement with said friction means to compress said friction means and engage said other differential side gear with said case to transmit rotation from said case through said friction means to said other differential side gear and thereby increase the torque of the driven shaft having increased reaction torque.

6. A limited slip differential for connecting a driving shaft with a pair of driven shafts as set forth in claim 5 which includes,
- said first and second shaft members each having a shoulder portion at one end portion thereof,
- said shoulder portions being spaced from said first and second differential side gears,
- first bearing means positioned in abutting relation with said shoulder portions and said first and second differential side gears to rotatably support said first and second differential side gears relative to each other on said shaft members, and
- second bearing means positioned between and in abutting relation with said first and second differential side gears for connecting said first and second differential side gears for transmitting axial movement of one said differential side gears to the other of said differential side gears.

7. A limited slip differential for connecting a driving shaft with a pair of driven shafts as set forth in claim 1 which includes,
- resilient means positioned between said case and said friction means for maintaining a preselected load on said friction means to thereby exert a preselected torque bias on said first and second differential side gears.

8. A limited slip differential for connecting a driving shaft with a pair of driven shafts as set forth in claim 5 in which said resilient means includes,
- a Belleville spring assembly abutting said friction means and said case sidewall,
- said Belleville spring assembly being arranged to exert a biasing force upon said friction means to maintain a preselected clutch load on said first and second differential side gears and thereby exert a preselected torque bias on said differential side gears.

* * * * *